United States Patent Office 2,748,683
Patented June 5, 1956

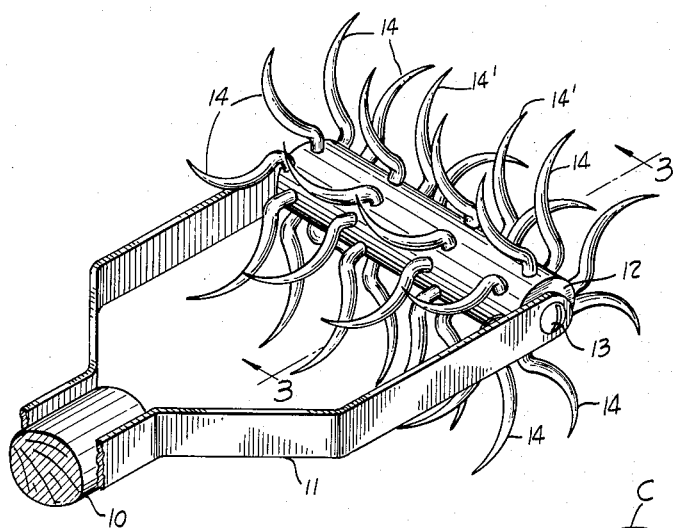
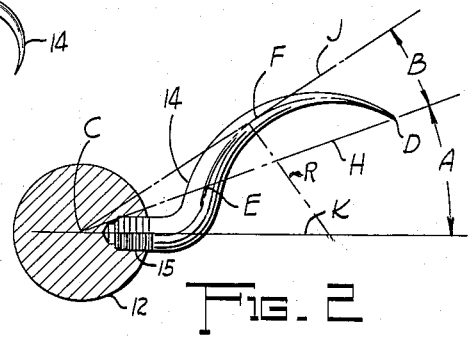
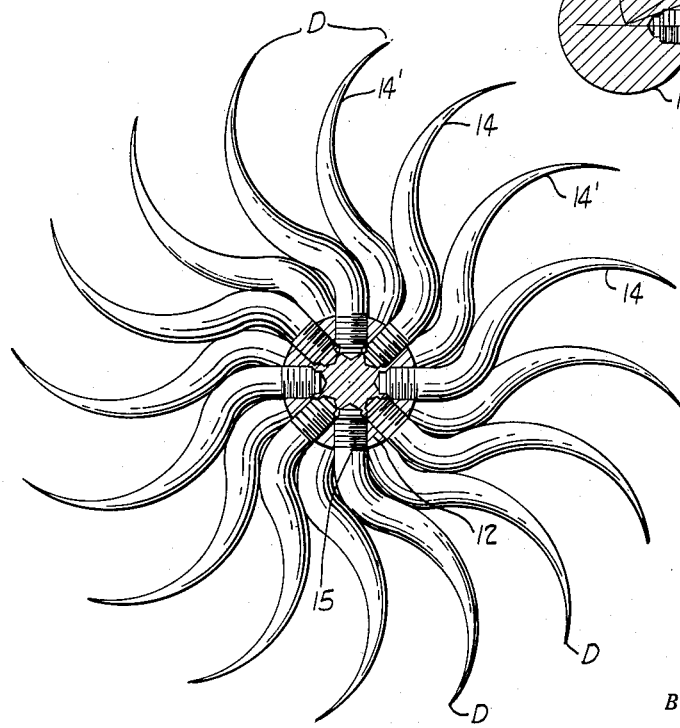
INVENTOR.
MILAN BAIRD

2,748,683

ROTATING HAND CULTIVATOR FOR LOOSENING SOIL

Milan Baird, Cleveland Heights, Ohio

Application September 27, 1952, Serial No. 311,891

1 Claim. (Cl. 97—52)

The present invention relates to a hand operated rotary garden cultivator and has for its object to provide a device of this nature which is easy to use, works the ground well and is fast in operation.

Conducive to a better understanding of the invention, it may be well to point out that numerous hand cultivators have been made with toothed rollers which scratch, score or cut the ground when passed over it. However, a strong downward pressure must be used with these prior art devices in order to force the teeth into the ground. This is especially true if deep cultivation is desired since such devices merely ride on their tooth ends if only a forward moving force is used with them. The use of weights or massive construction to secure ground penetration of the teeth is acceptable with power operated cultivators, but is objectionable in the case of hand cultivators which should be easily portable. The primary object of this invention, therefore, is to provide a hand cultivator whose toothed members have an inherent tendency to enter the ground as it is pushed forward and then exert a lifted force rearwardly of the cultivator to throw the broken clods upward as the teeth emerge from the ground. All of this being accomplished with the exertion of little or no downward pressure on the part of the operator.

These and other objects of the invention will become apparent from a reading of the following specification and claim, together with the accompanying drawing wherein:

Figure 1 is a perspective view of the hand operated soil cultivator embodying the features of the present invention with part of the handle broken away;

Figure 2 is a side view of one of the teeth as it appears mounted on the axle which is shown in section; and Figure 3 is a view taken along the line and in the direction of the arrows 3—3 of the Figure 1.

The device consists of cylindrical axle 12 made of steel or other suitable material, either solid or hollow, since the weight of the axle plays no part in the operation of the cultivator.

The axle is journaled in a suitable yoke or frame 11 by means of bearing screws 13 which pass through bearing holes in the yoke, as shown in the Figure 1. Any other type of suitable bearing suspension may be used if desired. A handle 10 made of wood or metal is secured to the yoke 11 by means of bolts or rivets as shown. The length of the handle being such that the device may be comfortably pushed along the ground as the operator walks forward.

A plurality of tapered and pointed teeth 14 are mounted around the circumference of the axle in rows which are spaced apart laterally on the axle. The teeth are made of hardened steel so that they may withstand the abrasions incident to their soil breaking function without undue wear.

Any number of teeth may be used, arranged in any number of rows, depending upon the width of the swath to be cultivated. However, in the preferred form illustrated there are four rows having eight teeth in each row. The teeth in each row are staggered slightly as shown in the Figure 1 to provide better clearance of the shanks 15 which are threadedly secured to the axle in threaded bores. Each tooth 14 consists of a shank portion 15 and a curved body portion ending in a pointed end D as shown in the Figures 2 and 3. While the teeth are illustrated as being threadedly attached to the axle 12, other means of securing them may be used such as riveting, brazing or welding. There are an even number of teeth in each row with the tooth shanks 15 arranged in diametrical opposition on the axle 12 as shown in the Figure 3.

The curvature, length and setting of the teeth is highly critical and determines the ground entering, breaking and ejecting efficiency of the device relative to the amount of physical energy that must be exerted. To keep this energy at a minimum, the following dimensions and angles must be maintained.

As can be seen by reference to the Figure 2, each tooth comprises a shank portion 15 and a curved and tapered body portion bent at an obtuse angle thereto. The tooth shank is attached to the axle 12 in a position normal to the circumference thereof at the point of contact. The body portion of the tooth is given a gradual taper having the arc-circle F as its center line and ending in a point D.

The length of the arc of curvature or tooth circle line E—D is one-fourth the circumference of the circle whose radius R is that of the arc F. The setting of the tooth circle line F being such that a line C—J drawn through the center C of the axle will be tangent to the circle line at an angle that is 33¾° to a line K drawn through the center of the axle 12 and the shank 15. Again referring to the Figure 2, the angle A—B is 33¾°. The point D of the tooth is on a line H which passes through the axle center C at an angle of 22½° to the center line K of the shank 15 (or the angle A is 22½°). The point D is also located a distance from the surface of the axle 12 equal to twice the radius R of the arc of curvature F.

The distance across diametrical opposed tooth points D on the axle is five times the radius R of the arc of curvature F.

While the axle and teeth may be of any desired size, the foregoing proportions and angles must be rigidly held.

As illustrative of a preferred size of the cultivator, the radius R may be taken as one inch. In such a case, the arc of curvature F would be ¼ of 6.28 inches long, or 1.57 inches long. The distance from the tooth tip D to the surface of the axle 12 is two inches and the tip D is located at an angle of 22½" to the center line K of the shank 15. The circle of curvature F is tangent to a line J passing through the axle center C at an angle of 33¾° to the shank center line K. In the instant case the axle 12 must be one inch in diameter so that the distance between the tips D of opposite teeth in each row of eight is five inches as shown in the Figure 3.

The tooth ends D of the two outer rows of teeth 14 are laterally aligned with one another. The ends of the teeth 14' of the two inner rows are also laterally aligned with one another but in a position intermediate those of the outer rows as shown in the Figures 1 and 3. This breaks up the continuity of tooth engagement with the ground, thereby forming smaller clumps in the broken ground.

In use the cultivator is placed on the ground so that the teeth touching the ground are curved rearwardly relative to the direction in which the cultivator is being pushed. Forward rotation of the axle 12 causes the teeth 14 and 14' to enter the ground. Continued rotation of the axle causes the teeth to draw themselves into the ground, due to their peculiar shape and orientation, until the axle touches the ground surface. The cultivator then rolls on the axle and the rearwardly curved teeth emerge from the soil, throwing the earth clods upward and to the rear. Easy and effortless penetration to the full depth of the teeth is thus had.

With the cultivator just described, the depth of cultivation would be automatically held at two inches. The angle of contact and the angle of emergence from the ground being such that the cultivator digs itself into the ground and then throws the earth up to the rear with little or no downward thrust required on the part of the operator. The earth is actually lifted and thrown out of position and not merely scarified as is the case with prior art devices. Due to the light weight of the cultivator and the fact that downward pressure is not required, the operation of the cultivator does not tire the user. The soil may be broken up easily, quickly and thoroughly.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A rotating cultivator for loosening soil, comprising in combination, a frame including a handle, a cylindrical axle journaled in said frame and adapted to serve as a supporting and running wheel for the cultivator, and a plurality of curved and tapered pointed teeth arranged in spaced rows around the circumference of said axle and curved toward the rear relative to the direction of rotation each of said teeth being circular in cross-section; each of the said teeth having a shank portion normal to the surface of said axle and a curved and tapered body portion arcuately swept back at an angle to the shank portion, the length of the arc of curvature of the body portion being one-fourth the circumference of the circle whose radius is that of the arc, the angle between the center line of the shank and a radial line drawn through the center of the axle and lying tangent to the curved and tapered body portion being 33¾°, the point of the tooth being offset 22½° from the center line of the shank and spaced a distance from the surface of the axle equal to twice the radius of the said circle, and the distance between the points of opposed teeth being five times the said radius.

References Cited in the file of this patent

UNITED STATES PATENTS

| | | |
|---|---|---|
| 322,420 | Chambers et al. | July 21, 1885 |
| 634,825 | Mallon | Oct. 10, 1899 |
| 646,646 | Krueger | Apr. 3, 1900 |
| 2,188,644 | Short | Jan. 30, 1940 |

FOREIGN PATENTS

| | | |
|---|---|---|
| 410,731 | Germany | Mar. 16, 1925 |
| 118,059 | Australia | Jan. 24, 1944 |